(12) United States Patent
Parry

(10) Patent No.: US 7,283,264 B2
(45) Date of Patent: Oct. 16, 2007

(54) METHOD AND SYSTEM FOR DISTRIBUTING PRINT JOB

(75) Inventor: Travis J. Parry, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 935 days.

(21) Appl. No.: 09/989,340

(22) Filed: Nov. 20, 2001

(65) Prior Publication Data

US 2003/0095281 A1 May 22, 2003

(51) Int. Cl.
*G06F 3/12* (2006.01)
*G06F 15/00* (2006.01)
(52) U.S. Cl. .................... 358/1.15; 358/1.1
(58) Field of Classification Search ........... 358/1.15, 358/1.16, 468, 1.9; 709/223, 224, 228, 229; 710/7, 8, 9, 46, 47
See application file for complete search history.

(56) References Cited

U.S. PATENT DOCUMENTS

| | | | |
|---|---|---|---|
| 5,995,723 A | 11/1999 | Sperry et al. | |
| 5,999,945 A | 12/1999 | Lahey et al. | |
| 6,052,198 A | 4/2000 | Neuhard et al. | |
| 6,567,180 B1 * | 5/2003 | Kageyama et al. | 358/1.15 |
| 6,577,907 B1 * | 6/2003 | Czyszczewski et al. | 700/17 |
| 6,750,982 B1 * | 6/2004 | Takaira et al. | 358/1.9 |
| 2002/0055984 A1 * | 5/2002 | Chang et al. | 709/217 |

* cited by examiner

*Primary Examiner*—Douglas Q. Tran

(57) ABSTRACT

A method and system for distributing print jobs or other data stored in an e-mail enabled printing device wherein a user may distribute the print jobs or data using the e-mail enabled printer or by accessing an e-mail enabled printer with a browser capable network component.

20 Claims, 3 Drawing Sheets

METHOD AND SYSTEM FOR DISTRIBUTING PRINT JOB

FIELD OF THE INVENTION

The present invention relates generally to the use of e-mail enabled printers. More particularly, the present invention involves a system and method for transmitting and storing print job data using e-mail messaging in conjunction with networked e-mail enabled printers.

BACKGROUND OF THE INVENTION

In a typical printing process, a print job is sent by a computer to a buffer that is accessible to a printer. The printer retrieves the print job from the buffer, prints the print job, and deletes or releases the print job. Once printed, access to the print job is destroyed and a user must re-send the print job to create additional copies of the print job. Re-printing usually involves the retrieval of the print job by a user with the same computer, or with a computer having access to the location of the stored print job. Additionally, such print jobs are not typically stored in a printable format. Instead, the item to be printed is stored in a format that is readable by the software program that created the print job. Print driver software associated with the specific software program converts the print job to a printer readable format before sending the print job to a buffer. Thus, if the software program that created the print job is not available, it is often difficult to reproduce the print job.

In large enterprise systems where multiple software platforms may be used, the compatibility of files between machines and software programs is often hindered because each printer-enabled device does not necessarily have the desired software programs needed for printing each print job. Furthermore, print queues become crowded, and print jobs may take longer to print because of the backlog in the print queues. In addition, repetitive print jobs, such as forms that are used on a daily basis, regularly printed reports, or other static documents must be uploaded to the print queues each time that they must be printed. This may be a time consuming event and undesirable in certain situations.

A system for storing print jobs or other printable data in a memory accessible to a printer would be desirable if the print jobs or data could be easily recalled. Furthermore, the ability to send print jobs via e-mail from an e-mail enabled printer to another e-mail enabled device could help save time involved in the printing and distribution of print jobs or printable data.

SUMMARY OF THE INVENTION

The present invention relates generally to the use of e-mail enabled printers. More particularly, the present invention involves a system and method for transmitting and storing print job data using e-mail messaging in conjunction with networked e-mail enabled printers.

In one embodiment of the present invention, a print job stored within a memory of an e-mail enabled printer may be transmitted to other e-mail enabled printers or network devices as desired. Transmission of the stored print job, or other data, may be accomplished by instructing the e-mail enabled printer having access to the stored print job to retrieve the print job, attach the print job to an e-mail, and send the e-mail to a desired e-mail address or destination. Typically, a control panel, or a touch-screen display, incorporated with the e-mail enabled printer may be used to select a print job, or data, to be transmitted. A list of the available stored print jobs may be displayed for a user to select using the control panel or touch-screen display. An e-mail address to which to send the print job or data may then be selected in a similar manner from a list of available e-mail addresses stored in a memory accessible to the e-mail enabled printer. Alternatively, a user may enter a desired e-mail address using a control panel or touch-screen display capable of generating the necessary commands or characters required for an e-mail address.

In an alternate embodiment of the present invention a print job, or data, stored in a memory accessible to an e-mail enabled printer may be sent from one e-mail enabled printer to other network devices. In this embodiment, however, the commands to distribute the stored print job, or data, originate at a remote location to the e-mail enabled printer. For instance, a network workstation in communication with the e-mail enabled printer may operate software or hardware that provides the workstation user access to a list of print jobs, or data, that is accessible to the e-mail enabled printer. Using the workstation, the e-mail enabled printer may be instructed to retrieve a particular print job, attach the print job to an e-mail, and e-mail the information to another network device such as other e-mail enabled printers, e-mail servers, workstations, and the like. In addition, the e-mail enabled printer may be instructed to send an e-mail outside of a network connected to the e-mail enabled printer, such as through the Internet.

The method may include the selection of data from the job retention of an e-mail enabled printing device, attachment of the data to an e-mail message; using the e-mail enabled printing device to send the e-mail message and attached data to a second e-mail enabled printing device or to an e-mail enabled print server of a local network. The method may further include extracting the data at the second e-mail enabled printing device or e-mail enable print server, and converting the data into a print ready file by the second e-mail enabled printing device or e-mail enabled print server.

The embodiments of the present invention provide a method and system for distributing print jobs, or data, stored in memory accessible to an e-mail enabled printer. Using the methods and system of the present invention, stored print jobs are more easily distributed and the functionality of e-mail enabled printers may be improved.

DESCRIPTION OF THE DRAWINGS

While the specification concludes with claims particularly pointing out and distinctly claiming that which is regarded as the present invention, the present invention can be more readily ascertained from the following description of the invention when read in conjunction with the accompanying drawings in which:

DETAILED DESCRIPTION OF THE INVENTION

The present invention relates generally to the use of e-mail enabled printers. More particularly, the present invention involves a system and method for transmitting and storing print job data using e-mail messaging in conjunction with networked e-mail enabled printers.

Figure 1:
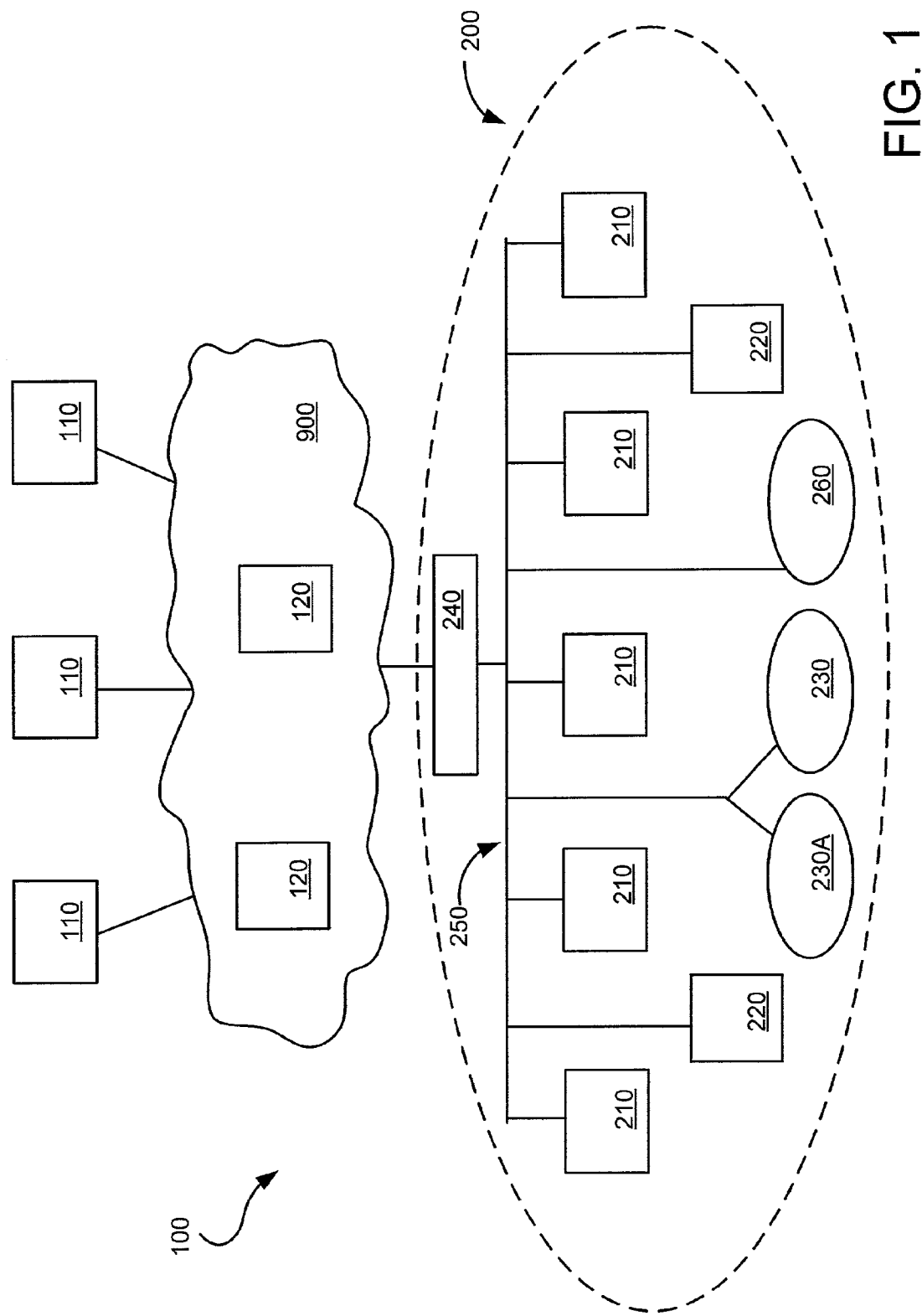
FIG. 1 illustrates one embodiment of a printing system for implementing the various embodiments of the present invention.

The various embodiments of the present invention may be carried out using a system such as that illustrated in drawing FIG. 1. A printing system 100 may comprise one or more remote workstations 110 capable of communicating through the Internet 900 using conventional communication techniques such as wired or wireless transmissions. The Internet 900 may include e-mail servers 120 for receiving and distributing e-mail received via the Internet 900. Network systems, such as network system 200, may connect to Internet 900 for sending and receiving data over the Internet 900. Network system 200 may include workstations 210, e-mail servers 220, e-mail enabled printers 230, print servers 260, and other network components. A firewall 240 may also be incorporated with network system 200.

Remote workstations 110 include devices such as personal computers, phones, personal data assistants (PDA), and the like. Communication between a remote workstation 110 and other remote workstations 110, network systems 200, e-mail servers 120, or other devices, commonly occurs through the Internet 900. Internet 900 communications are generally enabled by web-enabled software or hardware integrated with the remote workstations 110.

E-mail servers 120 are commonly used with the Internet 900, and are well known in the art. For example, Internet Service Providers (ISP) operate e-mail servers 120 such as Simple Mail Transfer Protocol (SMTP) servers. E-mail servers 120 receive, store and send e-mail messages to and from interconnected devices such as remote workstations, network systems, other e-mail servers, or e-mail capable devices. Typically, e-mail servers 120 are configured to receive e-mail routed to an e-mail address associated with the e-mail server 120 and to store the e-mail until an authorized client requests the e-mail. Once requested, the e-mail may be transmitted to an authorized user, or e-mail client, using an appropriate protocol, such as Post Office Protocol (POP3), Internet Message Access Protocol (IMAP), SMTP, or the like.

Typically, network system 200 is a local area network (LAN) or wide area network (WAN) in which network components are interconnected using wired or wireless data communications 250 known in the art. Typically, a network system 200 includes network components commonly known and used with computer networks. Although the illustrated components of network system 200 only include workstations 210, e-mail servers 220, e-mail enabled printers 230, e-mail enabled print servers 260, data communications 250, and a firewall 240, it is understood that additional network devices may be added to or removed from the network system 200.

Workstations 210 are typically computers connected to the network system 200. However, workstations 210 may include any device capable of transmitting inputted data over the data communications 250 of the network system 200. Preferably, the workstations 210 are conventionally configured to include a display, one or more microprocessors, RAM, ROM, one or more hard disks, a keyboard, and input/output devices. Software or hardware for managing e-mail may be stored or accessible to a workstation 210 for sending, receiving, and organizing e-mail messages. For simplicity, software or hardware configured for such tasks is referred to as "e-mail client software" herein and may include well known e-mail client software such as the GroupWise® software by Novell®, or Outlook® software by Microsoft®. Workstations 210 may also be configured with software or hardware for accessing, managing, and/or retrieving print job data files stored or resident in the memory of an e-mail enabled printer 230 connected to the network system 200.

E-mail servers 220 are similar to e-mail servers 120, the only difference being that e-mail servers 220 are connected to a network system 200 and may be protected by a firewall 240.

E-mail enabled printers 230 include e-mail enabled printing devices linked to the network system 200 through data communications 250. This includes conventional printing devices such as laser printers, inkjet printers, impact printers, photographic printers, facsimile machines, digital projectors, any imagining device, or the like, that are e-mail enabled and primarily configured for fulfilling network printing needs. E-mail capabilities may be provided to the e-mail enabled printers 230 by e-mail client software stored or accessible to the e-mail enabled printer 230. Similarly, e-mail enabled printers 230 may include conventional printer hardware and software for performing tasks typically associated with printing devices.

Figure 2:
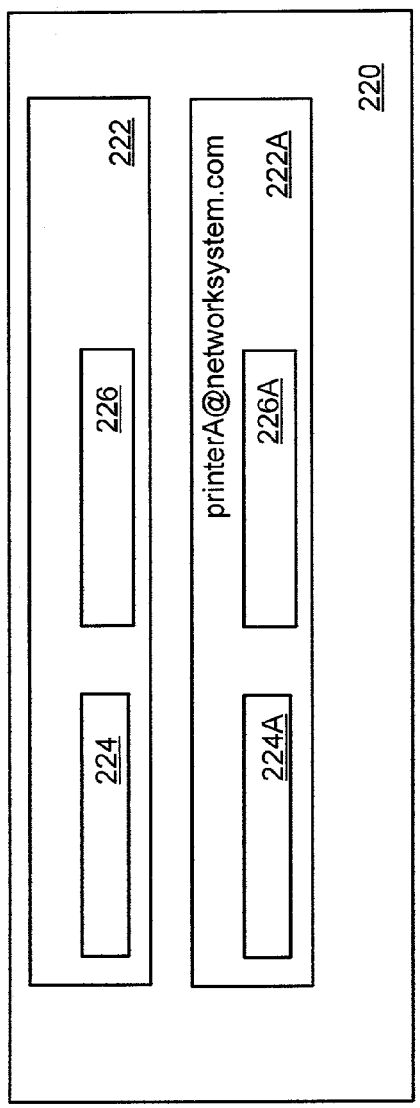
FIG. 2 illustrates various components of an e-mail server used in accordance with the present invention.

An e-mail enabled printer 230 may be assigned one or more e-mail addresses. Illustrated in FIG. 2 is an e-mail account 222 associated with an e-mail address assigned to an e-mail enabled printer 230 created and maintained on an e-mail server 220. Each e-mail account 222 may include an inbox 224 for storing incoming e-mails and an outbox 226 for storing outgoing, or sent, e-mails. The inbox 224 and outbox 226 of the e-mail account 222 typically include a file, or a directory of files, for storing and saving e-mails. For example, if e-mail enabled printer 230A illustrated in FIG. 1 is assigned the e-mail address: printerA@networksystem.com, an e-mail account 222A may be established on a network system 200 e-mail server 220, or on an Internet 900 e-mail server 120. The e-mail account 222A associated with the e-mail address of e-mail enabled printer 230A may include an inbox 224A for storing e-mail messages addressed to the e-mail enabled printer 230A and an outbox 226A for saving e-mail messages sent from e-mail enabled printer 230A.

E-mail enabled printers 230 also preferably include print server software configured for receiving, organizing, manipulating and storing print jobs transmitted from one or more e-mail accounts associated with the e-mail enable printer 230. Where an e-mail account 222 requires authentication for access, the e-mail enabled printer 230 may include software or hardware for performing automatic authentication upon the powering-on of the e-mail enabled printer 230. For instance, e-mail account 222A may require an authentication password before it may be accessed. Turning on e-mail enabled printer 230A executes a software function stored in the e-mail enabled printer 230A that automatically connects with e-mail account 222A and provides the necessary authentication password to access the e-mail account 222A. Successful submission and receipt of the authentication password allows the e-mail enabled printer 230A access to e-mail account 222A.

Figure 3:
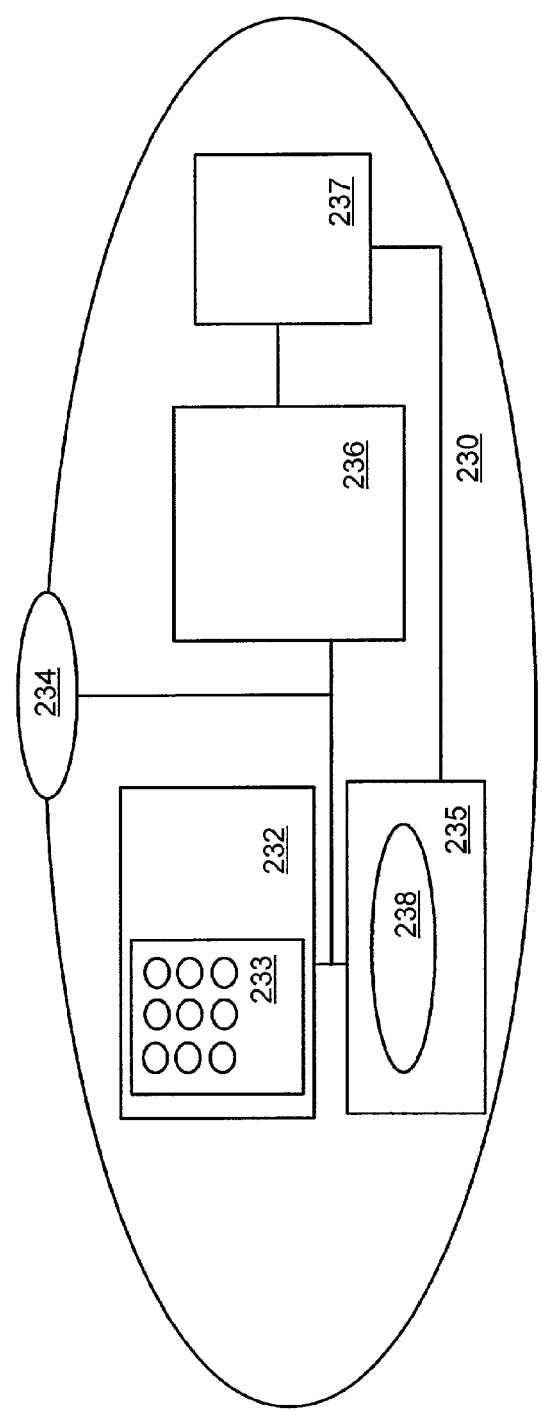
FIG. 3 illustrates various components of an e-mail enabled printer used in accordance with the present invention.

E-mail enabled printers 230 may include additional components as illustrated in FIG. 3. An e-mail enabled printer 230 may include one or more local displays 232 comprising conventional monitors, monitors coupled with an integrated displays, integrated displays (e.g., liquid-crystal displays), or other such displays for displaying print queues, print attributes, graphical user interfaces and associated data or processing information, including printer specific information. Preferably, the local display 232 includes a control panel 233 having touch screen, or button, controls for operating and controlling the e-mail enabled printer 230, altering print settings, print queues, print job retention, and other hardware and software aspects of e-mail enabled printer 230.

E-mail-enabled printers 230 typically include a network interface 234 for bi-directional data communication with networked components associated with network system 200 (e.g. workstations 210) and linkable devices residing outside the network system 200 (e.g., e-mail servers 120).

E-mail enabled printer 230 may further include memory 235 configured as one or more memory devices for storing data, software applications, operational instructions, and the like. Memory 235 may include memory in the form of read-only-memory (ROM), flash memory, random-access-memory (RAM), and/or hard disk memory. The memory 235 may be associated with a print cache 237 of e-mail-enabled printer 230 or it may be provided separately from a print cache 237. Typically, memory 235 includes a job retention memory 238 designated for temporarily or permanently storing one or more print jobs on hard disk memory or other data storage device accessible to e-mail enabled printer 230. Job retention memory 238 may be provided as a directory, series of directories, or one or more subdirectories configured for the storage of various print job data.

Print jobs stored in job retention memory 238 may be accessed using the control panel 233 or display device 232 of e-mail enabled printer 230. Alternatively, other network devices in communication with e-mail enabled printer 230, such as workstations 210, may access job retention memory 238. While residing in job retention memory 238, print jobs may be accessed, managed, and printed using the control panel 233 or display device 232 of e-mail enabled printer 230. Job retention memory 238 is particularly advantageous for use in storing files frequently used or printed, such as various types of forms (e.g., personnel forms, accounting forms, and other forms that are regularly printed), reports, calendars, time sheets, and the like. Job retention memory 238 can also be used to proof one copy of a print job before printing additional copies of a print job, and to print a private print job, using, for example, a personal identification number (PIN) to release the private print job to a print queue.

Preferably, one or more microprocessors 236 of an e-mail enabled printer 230 are configured to facilitate the operation of the e-mail enabled printer 230. This may include, for example, translating coded language received from print job data files, including print job data sent by e-mail transmissions, into a bit-mapped image format, or raster image format, saving print jobs or other data to memory 235, transmitting data from memory 235 to other network devices, or printing data. Microprocessor 236 may work in conjunction with a print server 260 and/or other associated software to store and/or queue the data files received or stored by the e-mail enabled printer 230.

As illustrated in FIG. 1, a firewall 240 may be used with network system 200 to protect the network system 200 from unauthorized access to network system 200 or unwanted data transfer. Firewall 240 typically comprises hardware and/or software for filtering all data traffic routed between Internet 900 and the network system 200. Firewalls 240 are well known in the art and shall not be described further herein.

In one embodiment of the present invention, data saved in the memory 235 of an e-mail enabled printer 230 is sent to another networked device, such as e-mail enabled printer 230A, using the e-mail enabled printer 230. In this manner, print jobs stored in the memory 235 of the e-mail enabled printer 230 may be easily shared with other networked devices.

Preferably, data commonly transmitted between the e-mail enabled printer 230 and other networked devices are stored in the job retention memory 238 of the e-mail enabled printer 230. For example, an electronic copy of a form commonly used by multiple network users may be stored in the job retention memory 238 of an e-mail enabled printer 230. Storage of the form in the job retention memory 238 allows a user to print the form from the e-mail enabled printer 230 any time that it is desired. The present invention provides a user an additional option: the form may be attached to an e-mail and sent to another networked device such as an e-mail enabled printer 230, a workstation 210, or an e-mail server 220. Using the present invention, a user is able to easily distribute print jobs from one e-mail enabled printer 230 to other networked devices.

Figure 4:
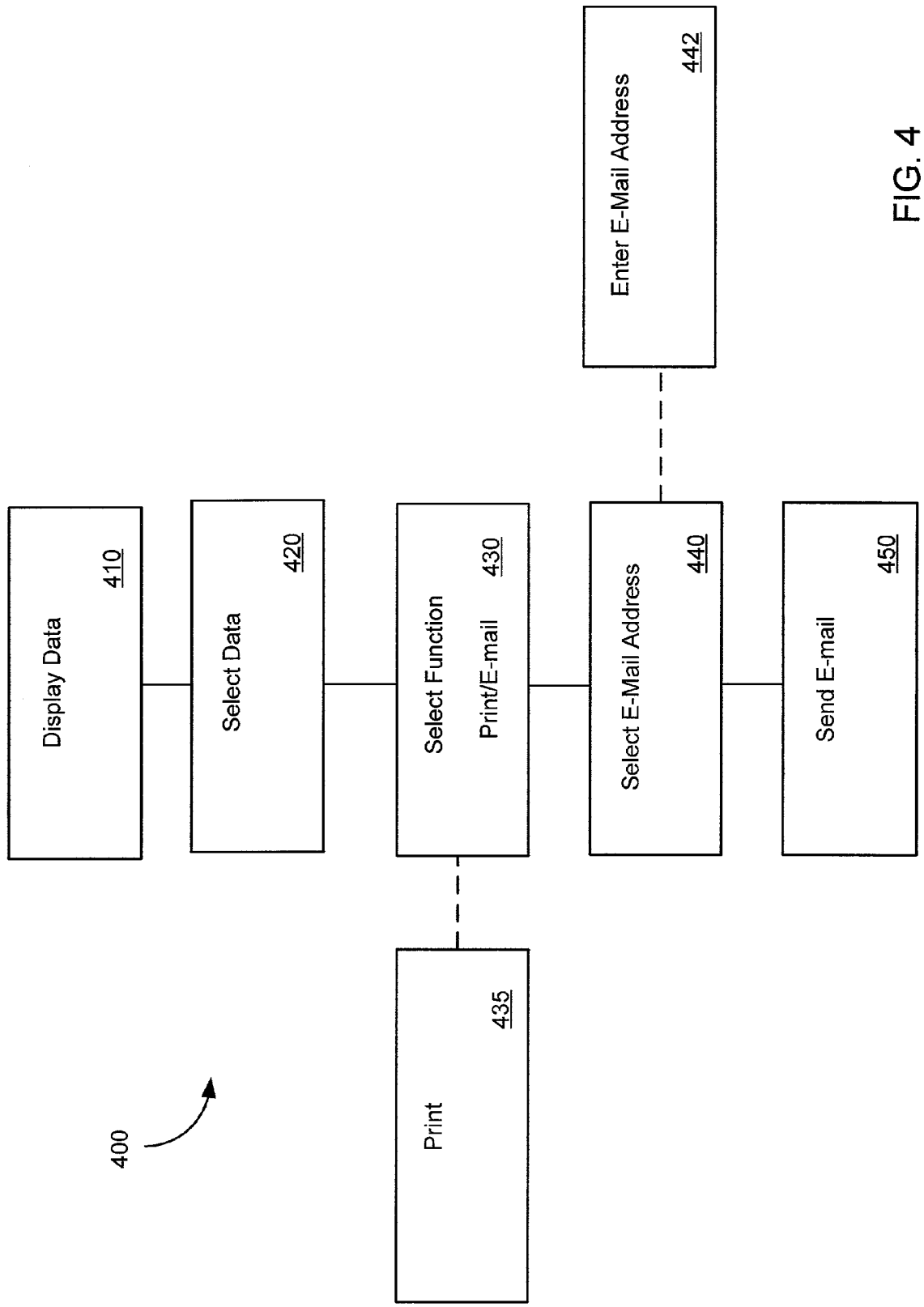
FIG. 4 illustrates a block diagram of the method steps of one embodiment of the present invention.

The operation of the present invention may be better explained with reference to FIG. 4 which illustrates a block diagram of one embodiment of the method of the present invention 400 that may be used to send stored data from the job retention memory 238 of an e-mail enabled printer 230 to another networked device. A list of data stored in the job retention memory 238 is first displayed 410 on a display device 232 of the e-mail enabled printer. A user may select 420 the desired data from the displayed list. The desired data may be selected 420 by the user in one of numerous ways. For instance, the user may use a control panel 233 of an e-mail enabled printer 230 to scroll through the list of data displayed on the display device 232 and then select 420 the desired data. Alternatively, if the display device 232 includes a touch-screen display, a user may select 420 the desired data by touching the selections location on the touch-screen display. Other selection methods may also be incorporated with the present invention.

Once the desired data is selected 420, the user must select the function 430 to perform on the data. Typically, a user might only be presented with the option to print 435 the selected data. However, the present invention provides a user the option to e-mail the selected data to a networked device or other device having an e-mail address. If the user selects the function 430 associated with e-mailing the selected data, the user is prompted to select an e-mail address 440 to which to send the selected data.

The e-mail enabled printer 230 may store a list of available, or commonly, used e-mail addresses corresponding with other networked devices that may be displayed for a user to select 440 from. For example, the e-mail enabled printer 230 may have the e-mail address of e-mail enabled printer 230A stored in memory 235 such that the e-mail address "printerA@networksystem.com" may be displayed on display device 232. A user could then select the e-mail address 440 "printerA@networksystem.com" using the control panel 233 or a touch screen display as previously described. Alternatively, the e-mail enabled printer 230 may allow a user to enter 442 an e-mail address to which the selected data is to be sent. An entered e-mail address may be stored in the memory 235 to be included any future list displays of available e-mail addresses.

Once the desired e-mail address is selected 440, or entered 442, the selected data is attached to an e-mail and sent 450 to the selected e-mail address. Alternatively, a user may choose multiple e-mail addresses to which to send the selected data file. Thus, the e-mail enabled printer 230 is capable of sending e-mails.

Using this embodiment of the present invention, a user may send selected data stored in the job retention memory 238 of an e-mail enabled printer 230 to other networked devices, or e-mail addresses, in communication with the e-mail enabled printer 230, either by the network, or over the Internet 900.

In an alternate embodiment of the present invention, a print job, or data, stored in the job retention memory 238 of e-mail enabled printer 230 may be accessed by a web based device, such that the web-based device may view, download, and/or print the print job or data stored in the job retention memory 238. For instance, a user logged into a workstation 210 of the network may access the job retention memory 238 of the e-mail enabled printer 230 using workstation 210. Once accessed, the user using workstation 210 may browse lists of data stored in the job retention memory 238. The user may select data from the job retention memory 238 and then print the data or choose to send the data to other networked devices by e-mail. For example, a user accessing a workstation 210, and desiring to send a form stored in the job retention memory 238 of e-mail enabled printer 230, may communicate with e-mail enabled printer 230. The user may access the data stored in the job retention memory 238 and select the desired data to e-mail to another networked device. Once the data is selected, the desired e-mail addresses to receive the selected data may be selected or entered using workstation 210. The selected data may then be sent to each selected or entered e-mail address, from e-mail enabled printer 230.

It is understood that devices other than a workstation 210 could also be used to send data stored in the job retention memory 238 of an e-mail enabled printer 230. Any device having web browsing capabilities, or the ability to communicate with and pass instructions or commands to an e-mail enabled printer 230, could be used.

Having thus described certain preferred embodiments of the present invention, it is to be understood that the invention defined by the appended claims is not to be limited by particular details set forth in the above description, as many apparent variations thereof are possible without departing from the spirit or scope thereof as hereinafter claimed.

What is claimed is:

1. A method of distributing print job data from an e-mail enabled printer, said print job data comprising data to be printed by the e-mail enabled printer, and said e-mail enabled printer capable of creating and sending e-mails, said method comprising:
   retrieving said print job data from a memory of said e-mail enabled printer;
   attaching said print job data to an e-mail created by said e-mail enabled printer;
   sending said e-mail and said print job data from said e-mail enabled printer to an e-mail enabled device; and
   storing said print job data in a job retention memory of said e-mail enabled device.

2. The method according to claim 1, wherein said retrieving said print job data from said memory of said e-mail enabled printer comprises retrieving said print job data from a job retention memory of said e-mail enabled printer.

3. The method according to claim 1, wherein said retrieving said print job data from said memory of said e-mail enabled printer is initiated using a device in communication with said e-mail enabled printer.

4. The method according to claim 3, wherein said device in communication with said e-mail enabled printer includes a network device selected from a group consisting of a workstation, an e-mail enabled printer, and an e-mail server.

5. The method according to claim 1, further comprising:
   creating an e-mail for attaching said print job data to, said e-mail including an e-mail address.

6. The method according to claim 5, wherein said creating said e-mail for attaching said print job data to comprises:
   providing a list of available e-mail addresses;
   selecting at least one of said available e-mail addresses; and
   creating an e-mail addressed to each of said selected at least one available e-mail addresses.

7. The method according to claim 6, wherein said providing said list of available e-mail addresses comprises:
   retrieving a list of stored e-mail addresses from a memory of said e-mail enabled printer; and
   displaying said list of stored e-mail addresses for selection.

8. The method according to claim 5, wherein said creating said e-mail for attaching said print job data to comprises:
   retrieving at least one e-mail address entered by a user; and
   creating an e-mail addressed to said at least one e-mail address entered by said user.

9. The method according to claim 1, wherein said attaching said print job data to said e-mail created by said e-mail enabled printer comprises attaching said print job data to an e-mail addressed to at least one designated e-mail address.

10. The method according to claim 1, wherein said sending said e-mail and said print job data to said e-mail enabled device comprises sending said e-mail and said print job data from said e-mail enabled printer to a network device selected from the group consisting of a workstation, an e-mail enabled printer, and an e-mail server.

11. A method of distributing a print job, comprising:
   storing one or more print jobs in a memory of an e-mail enabled printer, each of said print jobs comprising data to be printed by the e-mail enabled printer, and said e-mail enabled printer capable of creating and sending e-mails;
   selecting at least one of said one or more print jobs stored in said memory of said e-mail enabled printer for distribution;
   creating an e-mail with said e-mail enabled printer;
   attaching said data of said selected at least one print job to said e-mail; and
   sending said e-mail from said e-mail enabled printer for distributing said data of said selected at least one print job.

12. The method according to claim 11, wherein storing one or more print jobs in said memory of said e-mail enabled printer comprises:
   sending a print job to said e-mail enabled printer;
   receiving said sent print job at said e-mail enabled printer; and
   storing said print job in a job retention memory of said e-mail enabled printer.

13. The method according to claim 11, wherein said creating said e-mail comprises:
   retrieving a list of available e-mail addresses from said memory of said e-mail enabled printer;
   selecting at least one e-mail address from said retrieved list of available e-mail addresses; and
   addressing an e-mail with said selected at least one e-mail address.

14. The method according to claim 11, wherein said creating said e-mail comprises:
- entering at least one e-mail address into said e-mail enabled printer using a control panel of said e-mail enabled printer; and
- addressing an e-mail with said at least one entered e-mail address.

15. The method according to claim 11, wherein said selecting at least one of said one or more print jobs stored in said memory of said e-mail enabled printer for distribution comprises:
- retrieving a hit of print jobs stored in said memory of said e-mail enabled printer from said memory;
- displaying said list of print jobs stored in said memory;
- providing a control panel for selecting at least one of said print jobs in said list of print jobs; and
- selecting at least one of said print jobs using said control panel.

16. A system for distributing a print job, comprising:
- a network; and
- at least one e-mail enabled printer for communicating over said network, said e-mail enabled printer capable of creating and sending e-mails and comprising at least one microprocessor for operating said e-mail enabled printer; a display device for displaying said print job; and a job retention memory for storing data of said print job for distribution,
- wherein said at least one microprocessor of said e-mail enabled printer is configured to translate said data of said print job into an image format for printing by said e-mail enabled printer, and is configured to create an e-mail, attach said data of said print job to said e-mail, and send said e-mail and said data of said print job to an e-mail enabled device.

17. The system according to claim 16, wherein said e-mail enabled printer further comprises a control panel for selecting said print job from one or more print jobs displayed on said display device.

18. The system according to claim 16, wherein said e-mail enabled printer further comprises at least one list of e-mail addresses for displaying on said display device.

19. The system according to claim 16, further comprising:
- an Internet connection for communicating with said network;
- an e-mail server for communicating with said network; and
- at least one workstation for communication with said network.

20. A method of distributing print job data from an e-mail enabled printer, said print job data comprising data to be printed by the e-mail enabled printer, said method comprising:
- connecting said e-mail enabled printer to a network;
- retrieving said print job data from a memory of said e-mail enabled printer using a network device in communication with said e-mail enabled printer via said network;
- attaching said print job data to an e-mail;
- sending said e-mail and said print job data from said e-mail enabled printer to an e-mail enabled device; and
- storing said print job data in a job retention memory of said e-mail enabled device.

* * * * *

UNITED STATES PATENT AND TRADEMARK OFFICE
CERTIFICATE OF CORRECTION

PATENT NO.        : 7,283,264 B2                                        Page 1 of 1
APPLICATION NO.   : 09/989340
DATED             : October 16, 2007
INVENTOR(S)       : Travis J. Parry It is certified that error appears in the above-identified patent and that said Letters Patent is hereby corrected as shown below:

In column 9, line 12, in Claim 15, delete "hit" and insert -- list --, therefor.

Signed and Sealed this

Seventeenth Day of June, 2008

JON W. DUDAS
*Director of the United States Patent and Trademark Office*